(12) United States Patent
Kim et al.

(10) Patent No.: US 11,087,908 B2
(45) Date of Patent: *Aug. 10, 2021

(54) METHOD OF MANUFACTURING SUPERPARAMAGNETIC NANOCOMPOSITE AND SUPERPARAMAGNETIC NANOCOMPOSITE MANUFACTURED USING THE SAME

(71) Applicants: AMOLIFESCIENCE CO., LTD., Seoul (KR); PUSAN NATIONAL UNIVERSITY INDUSTRY-UNIVERSITY COOPERATION FOUNDATION, Busan (KR)

(72) Inventors: Sung-Il Kim, Gangwon-do (KR); Min-Young Choi, Gyeonggi-do (KR); Myoung-Yeol Lee, Gyeonggi-do (KR); Jae-Beom Lee, Gyeonggi-do (KR); Van Tan Tran, Gyeongsangnam-do (KR); Jeong-Hyo Kim, Gyeongsangnam-do (KR); Sang-Jin Oh, Gyeongsangnam-do (KR)

(73) Assignees: AMOLIFESCIENCE CO., LTD., Seoul (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,366

(22) Filed: Apr. 17, 2020

(65) Prior Publication Data
US 2020/0265978 A1 Aug. 20, 2020

Related U.S. Application Data

(63) Continuation of application No. 15/562,303, filed as application No. PCT/KR2017/008740 on Aug. 11, 2017, now Pat. No. 10,658,097.

(30) Foreign Application Priority Data

Aug. 19, 2016 (KR) .................. 10-2016-0105671

(51) Int. Cl.
  *H01F 1/34* (2006.01)
  *C01G 49/08* (2006.01)
  *H01F 1/00* (2006.01)

(52) U.S. Cl.
  CPC ............. *H01F 1/344* (2013.01); *C01G 49/08* (2013.01); *H01F 1/0054* (2013.01);
  (Continued)

(58) Field of Classification Search
  CPC ....... H01F 1/344; H01F 1/0054; C01G 49/08; C01P 2002/32; C01P 2002/10; C01P 2004/50; C01P 2004/64; C01P 2006/42
  See application file for complete search history.

(56) References Cited

U.S. PATENT DOCUMENTS 10,658,097 B2 * 5/2020 Kim .................. C01G 49/08
2011/0297871 A1 12/2011 Woo et al.
(Continued)

FOREIGN PATENT DOCUMENTS

EP  178416475  6/2020
JP  2011-207731  10/2011
(Continued)

OTHER PUBLICATIONS

Liu et al, "Highly Water-Dispersible äiocompanWe Magnetite Particles with low Cytotoxicity Stabilized by Citrate Groups", Angewandte Chemie, International Edition, vol. 48. No. 32. Jul. 27, 2009, pp. 5875-5879.*
(Continued)

Primary Examiner — C Melissa Koslow
(74) Attorney, Agent, or Firm — Wells St. John P.S.

(57) ABSTRACT

The present invention relates to a method of manufacturing a superparamagnetic nanocomposite and a superparamag-
(Continued)

netic nanocomposite manufactured using the same, and more particularly to a method of manufacturing a superparamagnetic nanocomposite suitable for use in magnetic separation for the detection of a target biomaterial and a superparamagnetic nanocomposite manufactured using the same. The method of manufacturing the superparamagnetic nanocomposite according to the present invention has a higher yield and a high rate without complicated processing than a conventional method of manufacturing a magnetic nanoparticle for magnetic separation and is capable of mass production of the superparamagnetic nanocomposite having excellent properties with uniform size and particle size distribution, high aqueous solution dispersibility and high magnetization and being capable of maintaining superparamagnetism.

1 Claim, 5 Drawing Sheets

(52) U.S. Cl.
CPC ...... *C01P 2002/32* (2013.01); *C01P 2004/03* (2013.01); *C01P 2004/50* (2013.01); *C01P 2004/51* (2013.01); *C01P 2004/62* (2013.01); *C01P 2004/64* (2013.01); *C01P 2006/22* (2013.01); *C01P 2006/42* (2013.01)

(56) References Cited

U.S. PATENT DOCUMENTS

| | | |
|---|---|---|
| 2012/0045399 A1 | 2/2012 | Choi et al. |
| 2016/0122797 A1 | 5/2016 | Kshirsagar et al. |

FOREIGN PATENT DOCUMENTS

| | | | |
|---|---|---|---|
| KR | 10-2012-0017556 | | 2/2012 |
| KR | 10-2012-0035013 | | 4/2012 |
| KR | 10-2012-0128050 | | 11/2012 |
| KR | 10-2014-0122223 | | 10/2014 |
| WO | WO 2014/200790 | * | 12/2014 |
| WO | WO 2016/0225503 | * | 2/2016 |

OTHER PUBLICATIONS

Liu, "Highly Water-Dispersible Biocompatible Magnetite Particles with Low Cytotoxicity Stabilized by Citrate Groups (Supporting Information)", Angewandte Chemie, Jan. 1, 2009, p. 17pp.
Liu, "Highly Water-Dispersible Biocompatible Magnetite Particles with Low Cytotoxicity Stabilized by Citrate Groups", Angewandte Chemie, International Edition, vol. 48, No. 32, Jul. 27, 2009, pp. 5875-5879.
Dongfang Liu et al., "Effective PEGylation of Iron Oxide Nanoparticles for High Performance In Vivo Cancer Imaging," Advanced Functional Materials, 2011, pp. 1498-1504.
European Search Report dated Dec. 20, 2018 in European Patent Application No. 178416475.
Hyunje Woo et al., "Recent developments in hybrid iron oxide-noble metal nanocatalysts for organic reactions," Catalysis Today 278 (2016) pp. 209-226.
Yuxia Tang, et al., "Synthesis of sub-100 nm biocompatible superparamagnetic Fe3O4 colloidal nanocrystal clusters as contrast agents for magnetic resonance imaging," RSC Advances (2016) pp. 62550-62555.

* cited by examiner

METHOD OF MANUFACTURING SUPERPARAMAGNETIC NANOCOMPOSITE AND SUPERPARAMAGNETIC NANOCOMPOSITE MANUFACTURED USING THE SAME

CROSS REFERENCE TO RELATED APPLICATION

This application resulted from a continuation of, and claims priority to U.S. patent application Ser. No. 15/562,303, which was filed Sep. 27, 2017, now U.S. Pat. No. 10,658,097, which is a 35 U.S.C. § 371 application of, and claims priority to, International Application No. PCT/KR2017/008740, which was filed on Aug. 11, 2017, and claims priority to KR Patent Application No. 10-2016-0105671, which was filed on Aug. 19, 2016, the teachings of the applications of which are incorporated herein by reference.

TECHNICAL FIELD

The present invention relates to a method of manufacturing a superparamagnetic nanocomposite and a superparamagnetic nanocomposite manufactured using the same, and more particularly to a method of manufacturing a superparamagnetic nanocomposite suitable for use in the detection of a target biomaterial and a superparamagnetic nanocomposite manufactured using the same.

BACKGROUND ART

The development of methods of detecting and quantifying a biomolecule such as a target biomarker at high sensitivity is regarded as very important in the fields of medical and life sciences, such as in the diagnosis of diseases and the development of new drugs. Representative and widely used is a binding assay based on an antigen-antibody immunoreaction, a DNA hybridization, a receptor reaction or the like, depending on the type of target material, and the presence of a target molecule is determined by means of a signal transducer that converts the binding event with the target molecule into a measurable signal.

A magnetic nanoparticle mediated isolation technique using magnetic force in the binding assay is advantageous because a target biomolecule is obtained in isolation from a suspended solution comprising various impurities or non-target materials, which are mixed together, through a concentrating process (positive isolation) or by removing non-target molecules (negative isolation), thus exhibiting a simplified assay, processing feasibility, high sensitivity, improved specificity, high-throughput screening, and scalability.

A magnetic nanoparticle mediated isolation technique is performed in a manner in which a ligand material that specifically binds to the target molecule is attached to particles, followed by recognizing and bonding of the ligand material to the target molecule in the mixed solution and separation of the magnetic particles using external magnetic force. Here, magnetic particles, suitable for use in a target molecule sensing platform, are required to (i) minimize non-specific adsorption from a variety of non-specific materials in a suspended solution, (ii) maintain the stability of colloidal particles from various biochemical environments, and (iii) facilitate surface bonding of various functional groups. In order to form a non-fouling bio-interface, the particles are preferably hydrophilic and neutral and contain hydrogen bond acceptors. To this end, PEGylation, that is, coating the surface of particles with poly(ethylene glycol) which is one of the biocompatible polymer is to date still considered to be the most successful way to design nanoparticles having a non-fouling bio-interface. The precisely adsorbed PEG layer satisfies the requirements listed above, reduces non-specific adsorption of particles and increases stability.

The present inventors provide a method of manufacturing a superparamagnetic nanocomposite, that is, a superparamagnetic iron oxide nanocomposite, suitable for use in magnetic separation for the detection of a target biomaterial. Thus, the method of manufacturing the superparamagnetic nanocomposite has a higher yield and a high rate without complicated processing than a conventional method of manufacturing a magnetic nanoparticle for magnetic separation and is capable of mass production of the superparamagnetic nanocomposite having excellent properties with uniform size and particle size distribution, high aqueous solution dispersibility and high magnetization and being capable of maintaining superparamagnetism, thereby culminating in the present invention.

DISCLOSURE

Technical Problem

Accordingly, the present invention is intended to provide a method of manufacturing a superparamagnetic nanocomposite having a higher yield and a high rate without complicated processing and being capable of mass production of the superparamagnetic nanocomposite having excellent properties with uniform size and particle size distribution, high aqueous solution dispersibility and high magnetization and being capable of maintaining superparamagnetism, and is also intended to provide a superparamagnetic nanocomposite manufactured by the method.

Technical Solution

The present invention provides a method of manufacturing a superparamagnetic nanocomposite, comprising: mixing an iron precursor, a solvent, a stabilizing agent and a reducing agent; subjecting a mixed solution in the mixing step to hydrothermal synthesis at a temperature of 150 to 300° C., preferably 200 to 240° C. and more preferably 200° C. and a pressure of 1.5 to 10 bar, preferably 1.5 to 6 bar and more preferably 1.5 to 2.5 bar to synthesize a superparamagnetic nanocomposite in nanocluster form; and separating the synthesized superparamagnetic nanocomposite.

The method of manufacturing the superparamagnetic nanocomposite according to the present invention may further include washing the separated superparamagnetic nanocomposite with a polar solvent.

In the method of manufacturing the superparamagnetic nanocomposite according to the present invention, the iron precursor may be selected from the group consisting of ferric chloride hexahydrate ($FeCl_3 \cdot 6H_2O$), ferrous chloride, ferrous chloride tetrahydrate, ferric chloride, and ferric nitrate nonahydrate ($Fe(NO_3)_3 \cdot 9H_2O$), and is preferably selected from the group consisting of ferric chloride hexahydrate ($FeCl_3 \cdot 6H_2O$), ferrous chloride, ferrous chloride tetrahydrate, and ferric chloride. More preferably useful is ferric chloride hexahydrate ($FeCl_3 \cdot 6H_2O$).

In the method of manufacturing the superparamagnetic nanocomposite according to the present invention, the solvent may be selected from the group consisting of ethylene glycol, diethylene glycol, triethylene glycol, tetraethylene glycol, dipropylene glycol, and glycerol. Preferably useful is ethylene glycol.

In the method of manufacturing the superparamagnetic nanocomposite according to the present invention, the stabilizing agent may be a compound having a carboxyl group.

In the method of manufacturing the superparamagnetic nanocomposite according to the present invention, the stabilizing agent may be selected from the group consisting of trisodium citrate dihydrate (HOC(COONa)(CH$_2$COONa)$_2$.2H$_2$O; C$_6$H$_5$Na$_3$O$_7$) and dicarboxyl poly(ethylene glycol) having a molecular weight of 500 to 50,000, preferably 2000 to 8000, and more preferably 2000.

In the method of manufacturing the superparamagnetic nanocomposite according to the present invention, the reducing agent may be selected from the group consisting of sodium acetate, sodium acrylate, urea, sodium formate, and ammonium acetate. Preferably useful is sodium acetate.

In the method of manufacturing the superparamagnetic nanocomposite according to the present invention, the iron precursor and the solvent may be mixed at a molar ratio of 1:10 to 1:300, and preferably 1:40 to 1:200.

In the method of manufacturing the superparamagnetic nanocomposite according to the present invention, the iron precursor and the stabilizing agent may be mixed at a molar ratio of 1:0.0000013 to 1:1, and preferably 1:0.0000013 to 1:0.8.

In the method of manufacturing the superparamagnetic nanocomposite according to the present invention, the iron precursor and the reducing agent may be mixed at a molar ratio of 1:1 to 1:20, preferably 1:3 to 1:15, and more preferably 1:7 to 1:15.

In the method of manufacturing the superparamagnetic nanocomposite according to the present invention, the polar solvent may be selected from the group consisting of ethanol, water, methanol, acetone, liquid ammonia, ethyl acetate, ether, tetrahydrofuran, potassium hydroxide, sodium hydroxide, and dichloromethane.

In the method of manufacturing the superparamagnetic nanocomposite according to the present invention, separating the synthesized superparamagnetic nanocomposite may be performed using a centrifuge or using magnetism, each of which may be conducted using typically useful methods.

In the method of manufacturing the superparamagnetic nanocomposite according to the present invention, washing the separated superparamagnetic nanocomposite with the polar solvent may be performed in a manner in which the superparamagnetic nanocomposite, separated during separating the synthesized superparamagnetic nanocomposite, is washed with a polar solvent to remove impurities, whereby the superparamagnetic nanocomposite is imparted with high stability and uniform particle distribution. The polar solvent may include any one selected from among ethanol, alcohol, liquid ammonia, acetone, methanol, chloroform, ethyl acetate, ether, tetrahydrofuran, potassium hydroxide, sodium hydroxide, dichloromethane, and water. During washing the separated superparamagnetic nanocomposite with the polar solvent, washing the separated superparamagnetic nanocomposite with a polar solvent is preferably performed three times. Here, the number of washing processes is not limited to 3, but the washing process may be conducted once or several times, and such simple modification of the number of washing processes may fall within the scope of the present invention.

Meanwhile, the superparamagnetic nanocomposite may be manufactured without performing washing the separated superparamagnetic nanocomposite with the polar solvent, but in order to exhibit high stability and uniform particle distribution as described above, the separated superparamagnetic nanocomposite is preferably washed with the polar solvent. Washing the separated superparamagnetic nanocomposite with the polar solvent may be performed using any one among typically useful methods. Here, washing the separated superparamagnetic nanocomposite with the polar solvent may be conducted using a centrifuge, which is one among typically useful methods, and achieving both separation and washing of the superparamagnetic nanocomposite during separating the synthesized superparamagnetic nanocomposite may fall within the scope of the present invention. This is because separating the synthesized superparamagnetic nanocomposite may be carried out separately through primary and secondary procedures and the like and may include separation and washing together.

In the method of manufacturing the superparamagnetic nanocomposite according to the present invention, washing the separated superparamagnetic nanocomposite with the polar solvent may include washing the separated superparamagnetic nanocomposite with an ethanol solvent and washing the superparamagnetic nanocomposite, washed with the ethanol solvent, with a water solvent. The washing process using the ethanol solvent is performed using an ethanol solvent, which is a polar solvent that facilitates the dissolution of a solvent and a reducing agent, whereby the ultimately obtained superparamagnetic nanocomposite may have favorable properties such as surface charge and the like. Also, washing the superparamagnetic nanocomposite, already washed with the ethanol solvent, with the water solvent is favorable because dispersion in a deionized water aqueous solution can be achieved, making it possible to realize magnetic separation for the detection of a target biomaterial.

In the method of manufacturing the superparamagnetic nanocomposite according to the present invention, the dispersibility of the superparamagnetic nanocomposite in an aqueous solution may be adjusted using the carboxylate (COO$^-$) group of the stabilizing agent.

In the method of manufacturing the superparamagnetic nanocomposite according to the present invention, the superparamagnetic nanocomposite may have a diameter of 100 nm to 450 nm. The superparamagnetic nanocomposite preferably has a diameter of 150 nm to 400 nm and more preferably 200 nm to 350 nm.

In addition, the present invention provides a superparamagnetic nanocomposite manufactured by the above method.

In the superparamagnetic nanocomposite according to the present invention, the superparamagnetic nanocomposite may have a diameter of 100 nm to 450 nm. The superparamagnetic nanocomposite preferably has a diameter of 150 nm to 400 nm, and more preferably 200 nm to 350 nm.

In the superparamagnetic nanocomposite according to the present invention, the superparamagnetic nanocomposite may comprises a magnetic nanocrystal having a diameter of from more than 0 to 10 nm, wherein a surface of the magnetic nanocrystal is stabilized by carboxylate (COO$^-$) group, wherein the superparamagnetic nanocomposite may have a plurality of magnetic nanocrystals clustered therein, have a nanoclustered shape having a diameter of 100 nm to 450 nm and have hydrophilicity so as to be dispersed in an aqueous solution. The superparamagnetic nanocomposite may have the nanoclustered shape having a diameter of 100 nm to 450 nm, and more preferably 200 nm to 350 nm.

In the superparamagnetic nanocomposite according to the present invention, the magnetic nanocrystal may be $Fe_3O_4$ having a diameter of from more than 0 to 10 nm.

In addition, the present invention provides a superparamagnetic nanocomposite comprising a magnetic nanocrystal which is $Fe_3O_4$ having a diameter of from more than 0 to 10 nm, wherein a surface of the magnetic nanocrystal is stabilized by carboxylate ($COO^-$) group, wherein the superparamagnetic nanocomposite has a plurality of magnetic nanocrystals clustered therein, has a nanoclustered shape having a diameter of 100 nm to 450 nm and has hydrophilicity so as to be dispersed in an aqueous solution. The superparamagnetic nanocomposite may have the nanoclustered shape having a diameter of 100 nm to 450 nm, and more preferably 200 nm to 350 nm.

Advantageous Effects

According to the present invention, a method of manufacturing the superparamagnetic nanocomposite has a higher yield and a high rate without complicated processing than a conventional method of manufacturing a magnetic nanoparticle for magnetic separation and is capable of mass production of the superparamagnetic nanocomposite having excellent properties with uniform size and particle size distribution, high aqueous solution dispersibility and high magnetization and being capable of maintaining superparamagnetism. Because a superparamagnetic nanocomposite manufactured by the method have high magnetization and is capable of maintaining superparamagnetism, the superparamagnetic nanocomposite can be utilized in magnetic separation for the detection of a target biomaterial.

MODE FOR INVENTION

A better understanding of the present invention will be given through the following Examples, which are merely set forth to illustrate, but are not to be construed as limiting the present invention and may be variously altered and modified.

In the present invention, a superparamagnetic nanocomposite refers to superparamagnetic particles having nanoclustered shape having a diameter of 100 to 450 nm, preferably 150 to 400 nm, and more preferably 200 to 350 nm configured such that single magnetic particles having a diameter of several nanometer (a diameter of from more than 0 to 10 nm), that is, magnetic nanocrystals, are clustered therein.

In the present invention, "room temperature" may refer to, but is not limited to, 15 to 25° C., which enables the most easily practicable reaction by a worker because increasing or decreasing the temperature is not necessary. Depending on the surrounding conditions and environments, the same may be a temperature higher or lower than the above range.

Here, superparamagnetism is a property that may be controlled using a magnetic force and enables re-dispersion in the absence of a magnetic force, and a superparamagnetic nanocomposite may be utilized in diverse fields requiring magnetic nanoparticles having superparamagnetism.

Reference Example 1. Material Preparation

Ferric chloride hexahydrate ($FeCl_3.6H_2O$, ACS reagent, 97%, MW=270.30), trisodium citrate dihydrate (HOC$(COONa)(CH_2COONa)_2.2H_2O$; $C_6H_5Na_3O_7$, 99%, MW=294.10), sodium acetate anhydrous ($C_2H_3NaO_2$, MW=82.03), and ethylene glycol anhydrous ($C_2H_6O_2$, 99.8/%, MW=62.07) were purchased from Sigma-Aldrich (St. Louis, Mo., USA), and dicarboxyl poly(ethylene glycol) (PEG-diacid; polyethylene glycol diacid) (COOH-PEG-COOH, MW=2000) was purchased from Jenkem Technology (Beijing, China). Ultrapure water (Nanopure $H_2O$; >18.0 MΩ) was purified using a Milli-Q water purification system.

Example 1. Method of Manufacturing Superparamagnetic Nanocomposite

Figure 1:
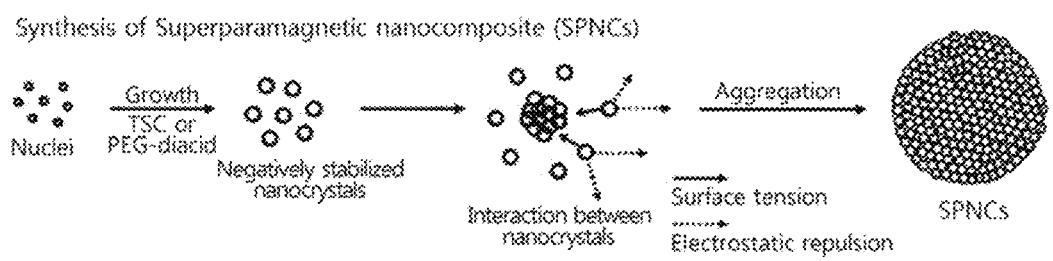
FIG. 1 schematically shows a method of manufacturing a superparamagnetic nanocomposite (particularly, superparamagnetic iron oxide nanocomposite) having magnetic nanoclustered shape according to Examples 1 and 2.

A superparamagnetic nanocomposite (particularly a superparamagnetic iron oxide nanocomposite) having magnetic nanoclustered shape of Example 1 was synthesized using a method shown in FIG. 1.

1.08 g (0.1 M, 3.996 mmol) of $FeCl_3.6H_2O$ was dissolved in 40 mL of ethylene glycol and stirred for 30 min. Thereafter, 0.8 g (0.034 M, 2.720 mmol) of trisodium citrate dihydrate (TSC) was added to the stirred mixture and then further stirred at a rate of 900 rpm for 1 hr. After confirmation of completion of the complete dissolution of trisodium citrate, 2.4 g (0.731 M, 58.515 mmol) of sodium acetate was added to the mixture, and further stirred at 900 rpm for 30 min. Thereafter, the stirred mixture was placed in a Teflon tube for hydrothermal synthesis, enveloped with a stainless steel container so as to be hermetically sealed, placed in a hydrothermal synthesizer, heated from room temperature to 200° C. at a rate of 7° C./min, and reacted at 200° C. for 8 hr to 12 hr while maintaining the temperature at 200° C. When the temperature reached the maximum temperature (200° C.), the inner pressure of the sealed synthesis tube was maintained at 1.5 to 2.5 bar.

In the product synthesized through hydrothermal synthesis reaction, the supernatant was removed through magnetic separation, and the synthesized particles were washed with 30 mL of ethanol five times and deionized water five times and then dried, thus yielding a superparamagnetic nanocomposite. The magnetic separation was performed in a manner in which a sample was placed on a neodymium permanent magnet and particles were collected to thereby remove the supernatant, thus separating the particles. The synthesized particles may also be separated through centrifugation.

As shown in FIG. 1, magnetic nanocrystals, that is, magnetite nanocrystals configured such that the surface thereof is stabilized by the carboxylate (COO$^-$) group of the trisodium citrate dihydrate molecule (i.e. by chemisorbing or anchoring the carboxylate (COO$^-$) group of the trisodium citrate dihydrate molecule and the Fe—OH group) were formed, and the particles were negatively charged by the carboxylate (COO$^-$) group of the trisodium citrate dihydrate molecule to thus cause electrostatic repulsion, and were thus stabilized. Meanwhile, surface tension simultaneously acted in the clustering direction, thereby decreasing the high surface energy of the magnetic nanocrystals, and a superparamagnetic nanocomposite having a uniform size was formed through the balance of electrostatic repulsion and surface tension.

Example 2. Method of Manufacturing Superparamagnetic Nanocomposite

A superparamagnetic nanocomposite (particularly a superparamagnetic iron oxide nanocomposite) having magnetic nanoclustered shape of Example 1 was synthesized using a method shown in FIG. 1.

2.16 g (0.2 M, 7.991 mmol) of FeCl$_3$.6H$_2$O was dissolved in 40 mL of ethylene glycol and stirred for 30 min. Thereafter, 0.8 g (0.034 M, 2.720 mmol) 0.02 g (0.25 mM, 0.01 mmol) of PEG-diacid (polyethylene glycol diacid having MW of 2000) was added to the stirred mixture and then further stirred for 1 hr. After confirmation of completion of the complete dissolution of PEG-diacid, 2.4 g (0.731 M, 58.515 mmol) of sodium acetate was added to the mixture and further stirred for 30 min. Thereafter, the stirred mixture was placed in a Teflon tube for hydrothermal synthesis, enveloped with a stainless steel container so as to be hermetically sealed, placed in a hydrothermal synthesizer, heated from room temperature to 200° C. at a rate of 7° C./min, and reacted at 200° C. for 8 hr to 12 hr while maintaining the temperature at 200° C. When the temperature reached the maximum temperature (200° C.), the inner pressure of the sealed synthesis tube was maintained at 1.5 to 2.5 bar.

In the product synthesized through hydrothermal synthesis reaction, the supernatant was removed through magnetic separation, and the synthesized particles were washed with 30 mL of ethanol five times and deionized water five times and then dried, thus yielding magnetic nanoparticles. The magnetic separation was performed in a manner in which a sample was placed on a neodymium permanent magnet and particles were collected to thereby remove the supernatant, thus separating the particles. The synthesized particles may also be separated through centrifugation.

As shown in FIG. 1, magnetic nanocrystals, that is, magnetite nanocrystals configured such that the surface thereof is stabilized by the carboxylate (COO$^-$) group of the PEG-diacid molecule (i.e. by chemisorbing or anchoring the carboxylate (COO$^-$) group of the PEG-diacid molecule and the Fe—OH group) were formed, and the particles were negatively charged by the carboxylate (COO$^-$) group of the PEG-diacid molecule to thus cause electrostatic repulsion, and were thus stabilized. Meanwhile, surface tension simultaneously acted in the clustering direction, thereby decreasing the high surface energy of the magnetic nanocrystals, and a superparamagnetic nanocomposite having a uniform size was formed through the balance of electrostatic repulsion and surface tension.

Test Example 1. Physicochemical Properties of Superparamagnetic Nanocomposite 1-1. Observation of Shape of Superparamagnetic Nanocomposite Using SEM (Scanning Electron Microscope)

The superparamagnetic nanocomposites of Examples 1 and 2 were observed to determine the size and shape thereof using a SEM (S-4700, Hitachi, Tokyo, Japan). The results are shown in FIG. 2.

Figure 2:
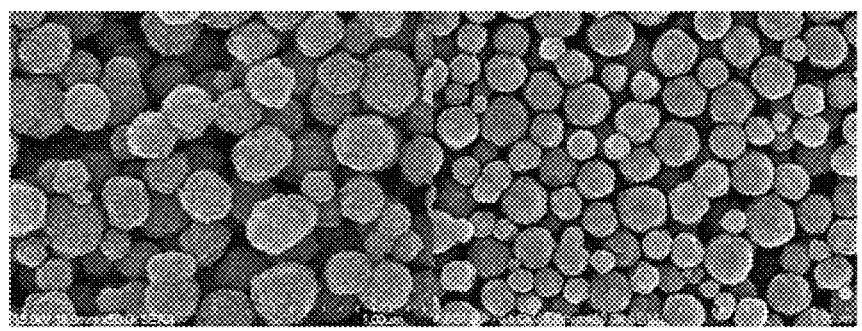
FIG. 2 shows the results of SEM observation of the superparamagnetic nanocomposites of Examples 1 and 2.

FIG. 2 shows the results of SEM observation of the superparamagnetic nanocomposites of Examples 1 and 2.

As shown in the SEM images of FIG. 2, the clustered structure of nanocrystals was observed on the surface of the cluster, and the particle size distributions of the superparamagnetic nanocomposites were 305.9±24.7 nm in Example 1 and 241.7±20.1 nm in Example 2.

As is apparent from the SEM images of the superparamagnetic nanocomposites of Examples 1 and 2, relative standard deviation upon measurement of the distribution of the superparamagnetic nanocomposites fell within 15%.

Therefore, the superparamagnetic nanocomposites of Examples 1 and 2 can be confirmed to have uniform size and particle size distribution.

1-2. Analysis of Size, Distribution and Surface Zeta Potential of Superparamagnetic Nanocomposites The size, distribution and surface zeta potential of the superparamagnetic nanocomposites of Examples 1 and 2 were measured using a Zetasizer (Nano ZS, available from Malvern) through dynamic light scattering particle size analysis. The superparamagnetic nanocomposites of Examples 1 and 2 were analyzed for average hydrodynamic diameter, PDI (polydispersity index) {PDI=(standard deviation of particle size/average particle size)$^2$} and surface zeta potential (three repeated measurements). The results are shown in Tables 1 and 2 below and in FIGS. 3 to 6.

Figure 3:
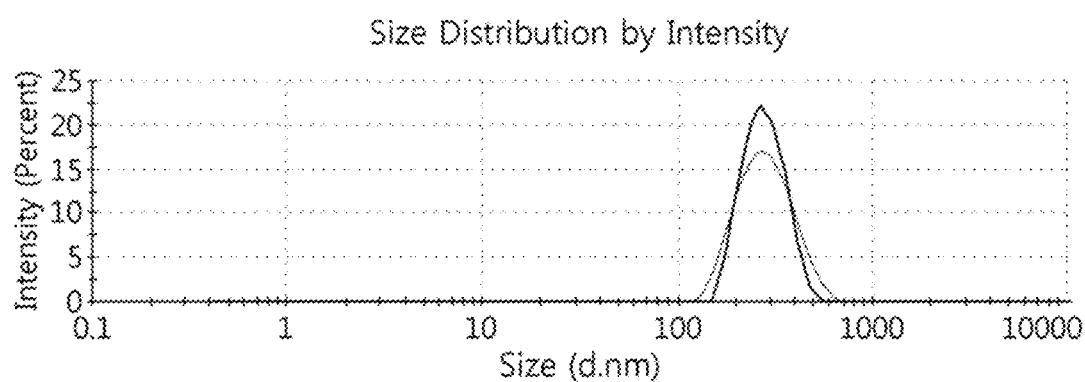
FIG. 3 shows the results of measurement of the size of the superparamagnetic nanocomposite of Example 1.
Figure 4:
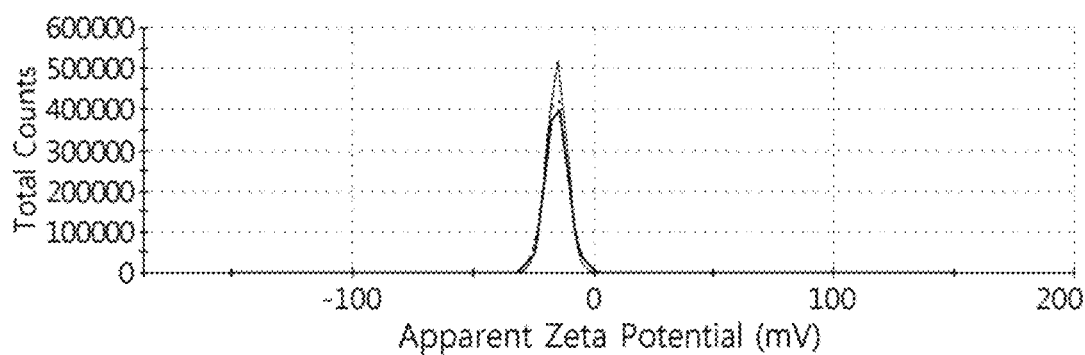
FIG. 4 shows the results of measurement of the zeta potential of the superparamagnetic nanocomposite of Example 1.
Figure 5:
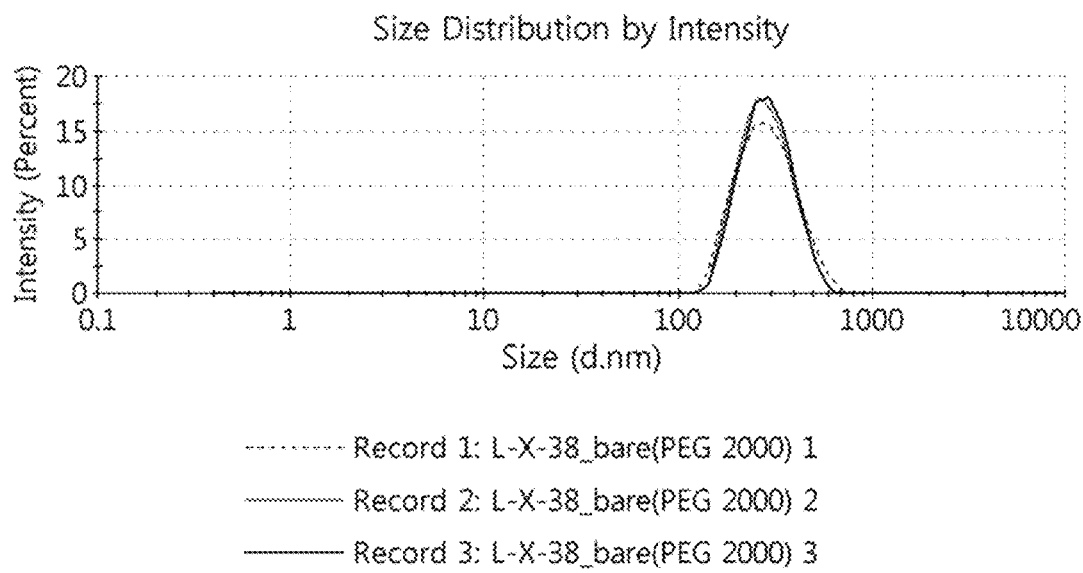
FIG. 5 shows the results of measurement of the size of the superparamagnetic nanocomposite of Example 2.
Figure 6:
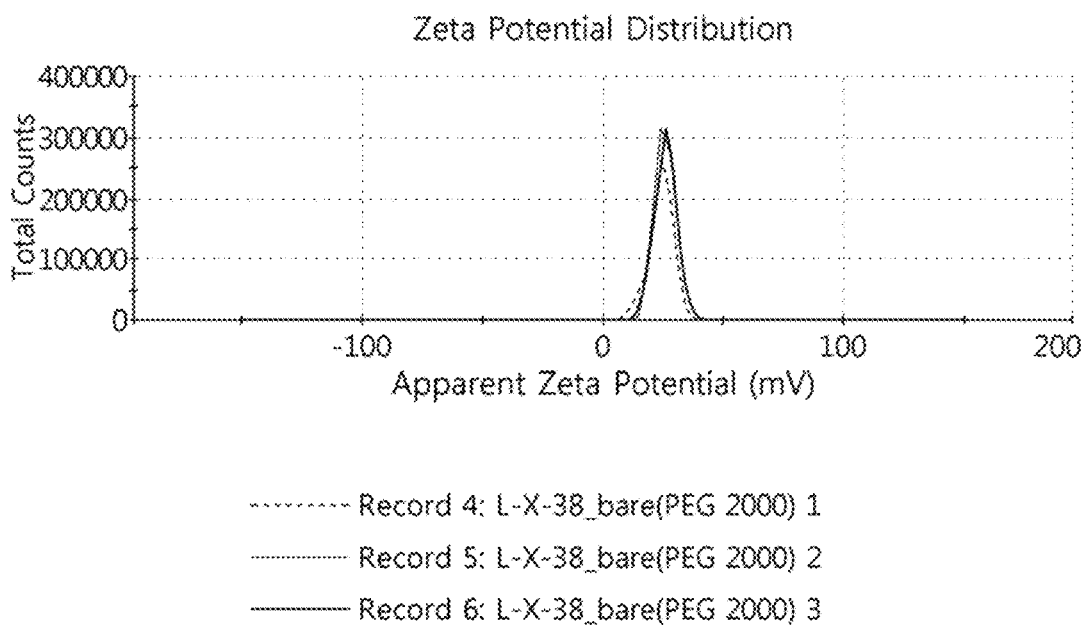
FIG. 6 shows the results of measurement of the zeta potential of the superparamagnetic nanocomposite of Example 2.

Specifically, Tables 1 and 2 show the results of average hydrodynamic diameter, PDI and surface zeta potential of the superparamagnetic nanocomposites of Examples 1 and 2, respectively. FIG. 3 shows the results of measurement of the size of the superparamagnetic nanocomposite of Example 1, FIG. 4 shows the results of measurement of the zeta potential of the superparamagnetic nanocomposite of Example 1, FIG. 5 shows the results of measurement of the size of the superparamagnetic nanocomposite of Example 2, and FIG. 6 shows the results of measurement of the zeta potential of the superparamagnetic nanocomposite of Example 2.

TABLE 1

| Classification | Size (nm) | PDI | Zeta potential (mV) |
| --- | --- | --- | --- |
| 1$^{st}$ Measurement | 255.8 | 0.067 | −15.4 |
| 2$^{nd}$ Measurement | 254.3 | 0.086 | −15.0 |
| 3$^{rd}$ Measurement | 252.6 | 0.066 | −15.0 |
| Average | 254.2 | 0.073 | −15.1 |

TABLE 2

| Classification | Size (nm) | PDI | Zeta potential (mV) |
|---|---|---|---|
| 1st Measurement | 268.7 | 0.100 | +24.3 |
| 2nd Measurement | 273.1 | 0.136 | +25.7 |
| 3rd Measurement | 273.4 | 0.077 | +26.0 |
| Average | 271.7 | 0.104 | +25.3 |

For the PDI of the superparamagnetic nanocomposites of Examples 1 and 2, based on a nearly monodisperse sample in the PDI range of 0 to 0.1, a mid-range polydisperse in the PDI range of 0.1 to 0.7, and sedimentation in the PDI range of >0.7, respective PDI values of Examples 1 and 2 were 0.073 and 0.104, falling in the range of less than 0.1 to about 0.1, corresponding to nearly monodisperse. Briefly, the superparamagnetic nanocomposites of Examples 1 and 2 had a uniform size and particle size distribution.

Also, respective zeta potentials of the superparamagnetic nanocomposites of Examples 1 and 2 were −15.1 mV and +25.3 mV, falling in the zeta potential range of ±10-30 mV, from which the superparamagnetic nanocomposite particles are evaluated to be efficiently dispersed through electrostatic repulsion. The superparamagnetic nanocomposites of Examples 1 and 2 were stabilized by the carboxylate ($COO^-$) group, and thus had a zeta potential of ±10-30 mV, thereby exhibiting high dispersibility in an aqueous solution.

1-3. Analysis of Magnetism of Superparamagnetic Nanocomposites

Figure 7:
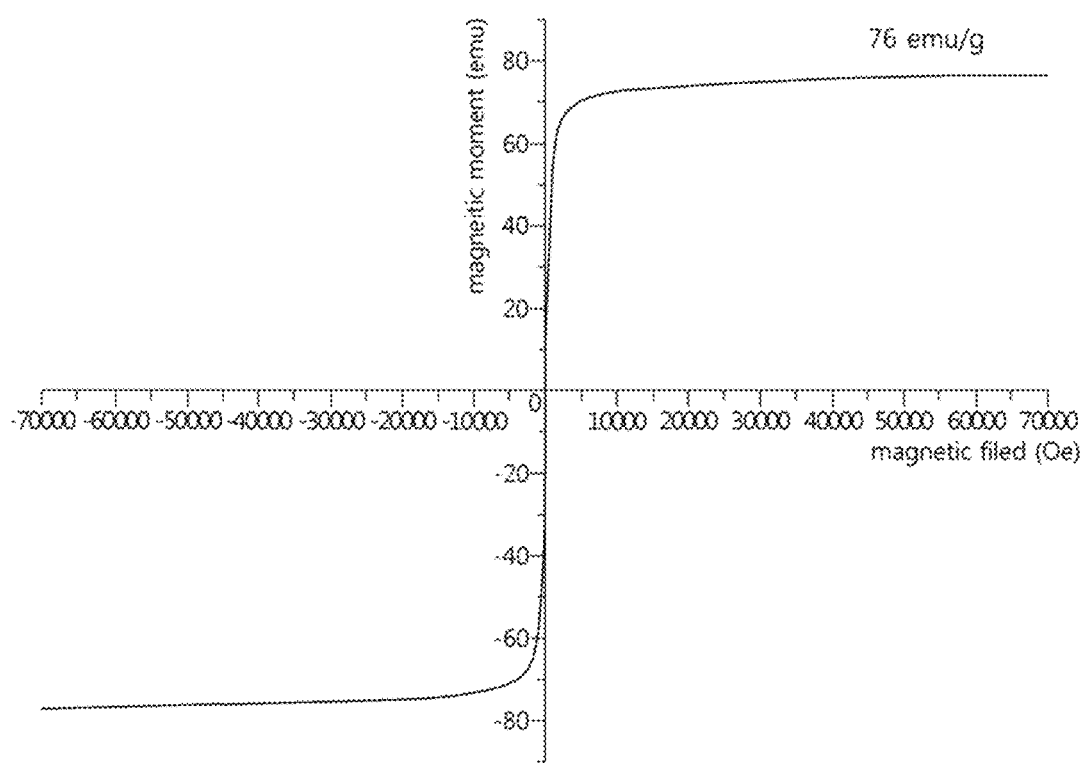
FIG. 7 shows the results of measurement of the magnetism of the superparamagnetic nanocomposite of Example 1.
Figure 8:
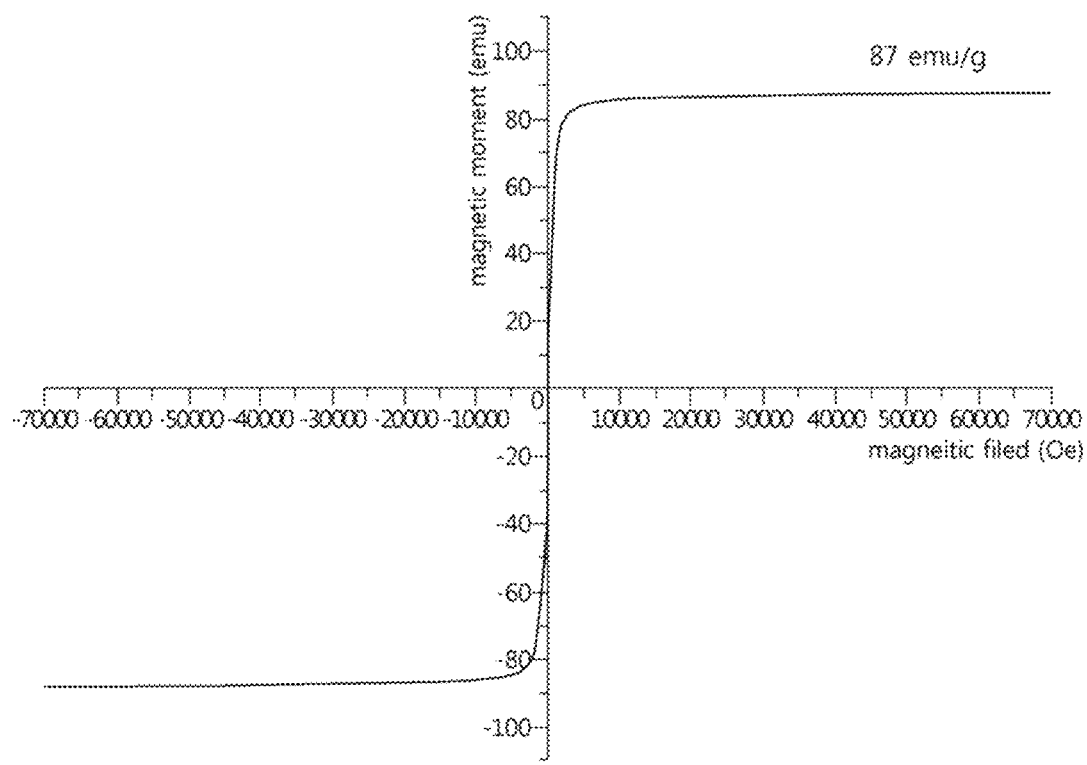
FIG. 8 shows the results of measurement of the magnetism of the superparamagnetic nanocomposite of Example 2.

In order to evaluate whether the superparamagnetic nanocomposites of Examples 1 and 2 have high magnetization with superparamagnetism and thus have high separation capability suitable for use in magnetic separation, magnetism was measured using a superconductive quantum interference device. The results are shown in FIGS. 7 and 8. FIGS. 7 and 8 show the magnetic hysteresis loops of the superparamagnetic nanocomposites, as the result of measurement of magnetism.

As shown in FIGS. 7 and 8, the superparamagnetic nanocomposites of Examples 1 and 2 exhibited superparamagnetism at a temperature of 300 K, and saturation magnetization values of Example 1 and 2 were 76 emu/g and 87 emu/g, respectively.

A ferromagnetic material is unsuitable for use in magnetic nanoparticle-mediated isolation technology because clustering of particles may strongly occur when a ferromagnetic material, having high residual magnetization, is repeatedly subjected to an external magnetic field. However, it is typically difficult to maintain the superparamagnetism of magnetic materials at room temperature. In particular, super-para-ferromagnetism transition occurs readily depending on how efficiently single domains are adjusted, regardless of the structures of magnetic materials or magnetic composites. Although the superparamagnetic nanocomposites of Examples 1 and 2 according to the present invention are configured such that tens of thousands of superparamagnetic nanocrystals are clustered, a final cluster, that is, a superparamagnetic nanocomposite having a diameter of 200 to 300 nm does not cause ferromagnetism transition, but superparamagnetism thereof is efficiently maintained.

Also, the superparamagnetic nanocomposites of Examples 1 and 2 according to the present invention have high magnetization and thus high separation capability suitable for use in magnetic separation.

Test Example 2. Analysis of Magnetic Separation Capability of Superparamagnetic Nanocomposite 2-1. Isolation Test of Red Blood Cells (RBCs) in Whole Blood Using Superparamagnetic Nanocomposite In order to evaluate the magnetic separation capability of the superparamagnetic nanocomposite of Example 1, a test was performed in a manner in which RBCs were captured and isolated from whole blood to thus measure the separation capability thereof.

The surface of the superparamagnetic nanocomposite of Example 1, configured such that magnetic nanocrystals were clustered, was functionalized with an anti-RBC antibody (Fitzgerald, Human RBC antibody, Cat #20R-RR006) through an EDC (1-ethyl-3-(3-dimethylaminopropyl)-carbodiimide)/sulfo-NHS (N-hydroxysulfosuccinimide)-mediated covalent-bond-inducing process. Specifically, 10 mg/500 μL of superparamagnetic nanocomposite particles were added with 10 mg/mL of EDC and 50 μL of sulfo-NHS, stirred at room temperature for 15 min, added with 1 mg of anti-RBC antibody, stirred at room temperature for 2 hr, and then washed five times with PBS (Phosphate-buffered saline) (pH 7.4). A PBS (pH 7.4) containing 0.5 mg/25 μL of the anti-RBC antibody-functionalized superparamagnetic nanocomposite was added to 25 μL of a whole blood sample, reacted at room temperature for 5 min, and then subjected to magnetic separation, thus separating the anti-RBC antibody-functionalized superparamagnetic nanocomposite. Thereafter, the separated anti-RBC antibody-functionalized superparamagnetic nanocomposite and the supernatant were observed under a microscope to count the number of RBCs, and the RBC separation capability (%) was calculated based on Equation 1 below. The results are shown in FIG. 9.

Figure 9:
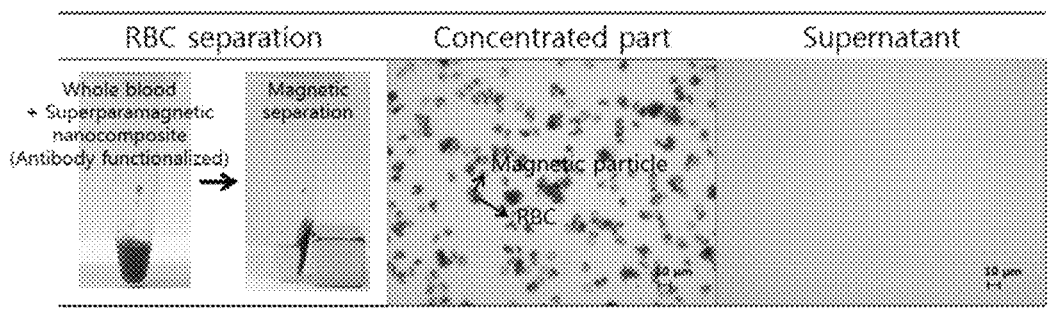
FIG. 9 shows tube photographs before and after isolation of red blood cells (RBCs) and microscope images of the separated superparamagnetic nanocomposite and the supernatant.

FIG. 9 shows the tube photographs before and after separation of RBCs and the microscope images of the separated superparamagnetic nanocomposite and the supernatant.

RBC separation capability (%)=number of captured RBCs/(number of captured RBCs+number of noncaptured RBCs)×100            [Equation 1]

As shown in FIG. 9, in the left tube photograph, in which the whole blood sample and the anti-RBC antibody-functionalized superparamagnetic nanocomposite were mixed, RBCs were captured through a specific reaction with the antibody of the surface of the superparamagnetic nanocomposite, and the magnetic particles were isolated by an external magnetic field, whereby whole blood, which is red in color, was separated by the superparamagnetic nanocomposite and became transparent. When the separated RBCs and the superparamagnetic nanocomposite bound to RBCs by the antibody are observed under a microscope, RBCs (pale color) and the superparamagnetic nanocomposite (relatively deep black) are seen to efficiently bind to each other, and no portion where only RBCs were present was observed. Moreover, the microscope image of the supernatant showed that RBCs were not observed.

The RBC separation capability of the superparamagnetic nanocomposite was calculated to be 99.5% based on Equation 1. Thereby, the target RBCs alone were specifically captured and isolated from whole blood containing an excess of non-target immunoglobulin within a short reaction time of 5 min using the magnetic particles, and were thus rapidly separated.

The invention claimed is:

1. A superparamagnetic nanocomposite comprising a magnetic nanocrystal which is $Fe_3O_4$ having a diameter of from more than 0 to 10 nm, wherein a surface of the magnetic nanocrystal is stabilized by carboxylate (COO—) group of dicarboxyl poly(ethylene glycol) having a molecular weight of 500 to 50,000, wherein the superparamagnetic nanocomposite has a plurality of magnetic nanocrystals clustered therein, has a nanoclustered shape having a diameter of 200 nm to 450 nm and has hydrophilicity so as to be dispersed in an aqueous solution.

* * * * *